US010902405B1

(12) United States Patent
Maeng

(10) Patent No.: US 10,902,405 B1
(45) Date of Patent: Jan. 26, 2021

(54) TRANSIENT MOBILE WALLETS

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 982 days.

(21) Appl. No.: 15/152,120

(22) Filed: May 11, 2016

(51) Int. Cl.
*G06Q 20/32* (2012.01)
*G06Q 20/36* (2012.01)
*G06Q 40/02* (2012.01)

(52) U.S. Cl.
CPC ..... *G06Q 20/3224* (2013.01); *G06Q 20/3223* (2013.01); *G06Q 20/363* (2013.01); *G06Q 20/3674* (2013.01); *G06Q 40/02* (2013.01)

(58) Field of Classification Search
CPC .......... G06Q 20/3224; G06Q 20/3223; G06Q 20/363; G06Q 20/3674; G06Q 40/02
See application file for complete search history.

(56) References Cited

U.S. PATENT DOCUMENTS

| | | | |
|---|---|---|---|
| 911,721 A | 2/1909 | Harris | |
| 5,375,251 A | 12/1994 | Pfundstein | |
| 5,748,737 A | 5/1998 | Daggar | |
| 5,943,624 A | 8/1999 | Fox | |
| 6,434,159 B1 * | 8/2002 | Woodward | G06Q 20/20 370/401 |
| 6,588,660 B1 | 7/2003 | Buescher et al. | |
| 6,636,833 B1 * | 10/2003 | Flitcroft | G06Q 20/00 235/380 |
| 6,944,447 B2 | 9/2005 | Portman et al. | |

(Continued)

FOREIGN PATENT DOCUMENTS

EP 2887272 A1 6/2015
WO WO-2007046785 A1 4/2007

(Continued)

OTHER PUBLICATIONS

Watkinson, John "The Art of Data Recording", Focal Press. pp. 2-3 (Year: 1994).*

(Continued)

*Primary Examiner* — Fahd A Obeid
*Assistant Examiner* — Michael Jared Walker
(74) *Attorney, Agent, or Firm* — Schwegman Lundberg & Woessner, P.A.

(57) ABSTRACT

A system includes a secondary computing device not owned by a user, a hardware processor, a memory and instructions that cause the processor to generate a transient wallet identifier (ID) for a transient mobile wallet, the transient mobile wallet being of limited duration, and provide a configuration user interface the user, presenting configuration information for the transient mobile wallet. The processor also identifies a usage specification for the transient mobile wallet defining allowed uses for the transient mobile wallet. The processor also activates the transient mobile wallet on the secondary computing device, receives a payment transaction approval request, compares the payment transaction data to the usage specification, determines that the payment transaction data is non-conforming, and transmits a rejection message for the first payment transaction.

20 Claims, 8 Drawing Sheets

(56) References Cited

U.S. PATENT DOCUMENTS

| | | | |
|---|---|---|---|
| 7,024,390 B1 | 4/2006 | Mori et al. | |
| 7,097,108 B2 * | 8/2006 | Zellner | G06K 19/06206 235/492 |
| 7,360,692 B2 | 4/2008 | Zellner et al. | |
| 7,438,236 B2 | 10/2008 | Top | |
| 7,562,818 B1 * | 7/2009 | Bierbaum | G07B 15/02 235/375 |
| 7,590,602 B1 * | 9/2009 | Luzzatto | G06Q 20/02 705/64 |
| 7,676,431 B2 | 3/2010 | O'Leary et al. | |
| 7,702,587 B2 | 4/2010 | Nguyen et al. | |
| 7,841,528 B2 | 11/2010 | Savry et al. | |
| 7,890,425 B2 | 2/2011 | Stanley | |
| 7,967,196 B1 | 6/2011 | Bierbaum et al. | |
| 8,019,365 B2 | 9/2011 | Fisher | |
| 8,095,113 B2 * | 1/2012 | Kean | G06F 21/31 455/406 |
| 8,108,261 B2 | 1/2012 | Carlier et al. | |
| 8,121,945 B2 * | 2/2012 | Rackley, III | G06Q 20/042 235/380 |
| 8,160,959 B2 * | 4/2012 | Rackley, III | G06Q 20/042 235/380 |
| 8,186,602 B2 | 5/2012 | Itay et al. | |
| 8,285,643 B2 * | 10/2012 | Isaacson | G06Q 20/105 705/41 |
| 8,352,323 B2 | 1/2013 | Fisher | |
| 8,360,329 B2 | 1/2013 | Grigg et al. | |
| 8,429,047 B2 | 4/2013 | Hurst | |
| 8,438,073 B2 | 5/2013 | White | |
| 8,463,674 B2 | 6/2013 | Hurst | |
| 8,489,067 B2 * | 7/2013 | Rackley, III | G06Q 20/102 455/406 |
| 8,511,543 B2 | 8/2013 | Yankovich | |
| 8,561,894 B1 | 10/2013 | Mullen et al. | |
| 8,565,723 B2 * | 10/2013 | Cox | G06F 21/31 455/410 |
| 8,589,237 B2 | 11/2013 | Fisher | |
| 8,612,350 B2 | 12/2013 | Lee | |
| 8,630,952 B2 * | 1/2014 | Menon | G06Q 20/20 705/44 |
| 8,639,629 B1 * | 1/2014 | Hoffman | G06Q 20/20 705/44 |
| 8,662,401 B2 | 3/2014 | Skowronek et al. | |
| 8,671,055 B2 * | 3/2014 | Spodak | G06K 19/06187 705/41 |
| 8,744,966 B1 * | 6/2014 | Amacker | G06Q 20/363 705/35 |
| 8,768,834 B2 * | 7/2014 | Zacarias | G06Q 20/36 705/41 |
| 8,768,845 B1 * | 7/2014 | Persson | G06F 21/57 235/379 |
| 8,776,132 B2 | 7/2014 | Low et al. | |
| 8,788,333 B2 | 7/2014 | Alba et al. | |
| 8,788,418 B2 * | 7/2014 | Spodak | G06K 19/06206 705/41 |
| 8,818,460 B2 * | 8/2014 | Kim | H04M 1/72563 455/566 |
| 8,818,867 B2 * | 8/2014 | Baldwin | G06Q 20/322 705/16 |
| 8,831,637 B2 | 9/2014 | Stopel et al. | |
| 8,851,372 B2 * | 10/2014 | Zhou | G06F 1/163 235/380 |
| 8,879,986 B2 * | 11/2014 | Fisher | H04B 11/00 455/41.1 |
| 8,880,886 B2 | 11/2014 | Kean et al. | |
| 8,918,080 B2 * | 12/2014 | Neal | H04W 12/12 455/411 |
| 8,923,827 B2 * | 12/2014 | Wentker | G06Q 20/10 455/414.1 |
| 8,972,286 B2 | 3/2015 | Grigg | |
| 8,977,569 B2 * | 3/2015 | Rao | G06Q 20/341 705/41 |
| 8,997,188 B2 * | 3/2015 | Svigals | G06F 21/31 726/4 |
| 9,014,662 B1 | 4/2015 | Gailloux et al. | |
| 9,015,066 B2 | 4/2015 | Scipioni et al. | |
| 9,047,494 B1 * | 6/2015 | Smith | H04W 12/06 |
| 9,047,728 B1 * | 6/2015 | Irudayam | G06Q 20/3221 |
| 9,049,190 B2 | 6/2015 | Slaton et al. | |
| 9,064,247 B2 * | 6/2015 | Baer | G06Q 20/227 |
| 9,092,776 B2 | 7/2015 | Dessert | |
| 9,092,778 B2 * | 7/2015 | Gibson | G06Q 20/4016 |
| 9,098,846 B2 * | 8/2015 | Gill | G06Q 20/1085 |
| 9,111,193 B2 * | 8/2015 | Poole | G06Q 20/3226 |
| 9,123,036 B2 | 9/2015 | Graylin et al. | |
| 9,123,065 B2 * | 9/2015 | Zhao | G06Q 20/12 |
| 9,129,199 B2 * | 9/2015 | Spodak | G06K 19/06187 |
| 9,129,273 B2 * | 9/2015 | Baldwin | G06Q 20/20 |
| 9,177,241 B2 * | 11/2015 | Spodak | G06K 19/072 |
| 9,185,109 B2 * | 11/2015 | Chen | H04L 63/0492 |
| 9,195,926 B2 * | 11/2015 | Spodak | G06K 19/06187 |
| 9,218,557 B2 * | 12/2015 | Spodak | G06K 19/06187 |
| 9,298,898 B2 * | 3/2016 | Koch | G06F 21/31 |
| 9,300,646 B1 * | 3/2016 | Saylor | H04L 63/08 |
| 9,317,018 B2 * | 4/2016 | Spodak | G05B 1/01 |
| 9,317,704 B2 * | 4/2016 | Brudnicki | H04L 63/102 |
| 9,317,846 B2 * | 4/2016 | Baldwin | G06Q 20/20 |
| 9,324,067 B2 * | 4/2016 | Van Os | G06Q 20/322 |
| 9,324,110 B2 * | 4/2016 | Wolfe | G06Q 40/04 |
| 2002/0054513 A1 | 5/2002 | Kao | |
| 2002/0077993 A1 | 6/2002 | Immonen et al. | |
| 2002/0179704 A1 | 12/2002 | Deaton | |
| 2004/0127256 A1 | 7/2004 | Goldthwaite et al. | |
| 2005/0076369 A1 * | 4/2005 | Cai | H04L 12/185 725/62 |
| 2007/0265984 A1 | 11/2007 | Santhana | |
| 2007/0284871 A1 | 12/2007 | Gray | |
| 2008/0051059 A1 | 2/2008 | Fisher | |
| 2009/0064301 A1 | 3/2009 | Sachdeva et al. | |
| 2009/0271253 A1 | 10/2009 | Arazy et al. | |
| 2009/0288012 A1 | 11/2009 | Hertel et al. | |
| 2010/0057580 A1 | 3/2010 | Raghunathan | |
| 2010/0125495 A1 | 5/2010 | Smith et al. | |
| 2010/0125508 A1 | 5/2010 | Smith | |
| 2010/0125510 A1 | 5/2010 | Smith et al. | |
| 2010/0223110 A1 | 9/2010 | Slavin et al. | |
| 2010/0318415 A1 | 12/2010 | Gottlieb | |
| 2011/0218907 A1 | 9/2011 | Dessert | |
| 2011/0295705 A1 | 12/2011 | Kasmei | |
| 2011/0295744 A1 | 12/2011 | Wisniewski et al. | |
| 2012/0023024 A1 | 1/2012 | Evans | |
| 2012/0089425 A1 | 4/2012 | Borucki | |
| 2012/0143752 A1 | 6/2012 | Wong et al. | |
| 2012/0166333 A1 | 6/2012 | von Behren et al. | |
| 2012/0197787 A1 | 8/2012 | Grigg | |
| 2012/0197794 A1 | 8/2012 | Grigg et al. | |
| 2012/0253852 A1 * | 10/2012 | Pourfallah | G06Q 20/3276 705/4 |
| 2013/0013499 A1 * | 1/2013 | Kalgi | G06Q 20/12 705/41 |
| 2013/0097041 A1 | 4/2013 | Fisher | |
| 2013/0103478 A1 | 4/2013 | Fisher | |
| 2013/0103511 A1 | 4/2013 | Fisher | |
| 2013/0103512 A1 | 4/2013 | Fisher | |
| 2013/0103513 A1 | 4/2013 | Fisher | |
| 2013/0103514 A1 | 4/2013 | Fisher | |
| 2013/0110658 A1 * | 5/2013 | Lyman | G06Q 20/20 705/18 |
| 2013/0151360 A1 | 6/2013 | Scipioni et al. | |
| 2013/0191279 A1 | 7/2013 | Calman et al. | |
| 2013/0204785 A1 | 8/2013 | Monk | |
| 2013/0260734 A1 | 10/2013 | Jain et al. | |
| 2013/0311363 A1 | 11/2013 | Ramaci | |
| 2013/0332337 A1 | 12/2013 | Tran | |
| 2014/0006276 A1 | 1/2014 | Grigg et al. | |
| 2014/0040126 A1 * | 2/2014 | Andrews | G06Q 20/105 705/41 |
| 2014/0058937 A1 | 2/2014 | Watson | |
| 2014/0089120 A1 * | 3/2014 | Desai | G06Q 20/322 705/21 |
| 2014/0129435 A1 | 5/2014 | Pardo et al. | |

(56) References Cited

U.S. PATENT DOCUMENTS

| | | | |
|---|---|---|---|
| 2014/0129438 A1* | 5/2014 | Desai | G06Q 20/08 705/41 |
| 2014/0136349 A1* | 5/2014 | Dave | G06Q 20/20 705/16 |
| 2014/0188720 A1 | 7/2014 | Aiglstorfer et al. | |
| 2014/0195422 A1 | 7/2014 | Zheng et al. | |
| 2014/0279106 A1 | 9/2014 | Smelcer | |
| 2014/0279403 A1 | 9/2014 | Baird et al. | |
| 2014/0291392 A1 | 10/2014 | Teuwen et al. | |
| 2014/0291406 A1 | 10/2014 | Ko | |
| 2014/0344153 A1* | 11/2014 | Raj | G06Q 20/3821 705/44 |
| 2015/0019427 A1 | 1/2015 | Murphy et al. | |
| 2015/0045068 A1 | 2/2015 | Soffer | |
| 2015/0186872 A1 | 7/2015 | Sobol et al. | |
| 2015/0235256 A1 | 8/2015 | Barsoum et al. | |
| 2015/0348007 A1 | 12/2015 | Khan et al. | |

FOREIGN PATENT DOCUMENTS

| | | | |
|---|---|---|---|
| WO | WO-2011072969 | A1 | 6/2011 |
| WO | WO-2012083113 | A3 | 6/2012 |
| WO | WO-2014084484 | A1 | 6/2014 |
| WO | WO-2014122453 | A2 | 8/2014 |

OTHER PUBLICATIONS

"Card1 Debuts Universal Card Technology Connecting Conventional Payment Card to Digital Wallet Platform", BusinessWire, (Sep. 21, 2015), 2 pgs.

"Contactless Mobile Payment Application Activation User Interface Overview, Usage Guidelines, and PPSE Requirements,", EMVCo, Version 1.0, (Dec. 2010), 120 pgs.

"Wallet-POS Specification", GSM Association, Version 1.0, (May 2013), 32 pgs.

Balan, Rajesh, et al., "The Digital Wallet: Opportunities and Prototypes", Invisible Computing IEEE Computer Society, (2009), 100-102.

Fundinger, Danny, "Using a mobile wallet: A day in the life", [Online]. Retrieved from the Internet: <URL: http://asmarterplanet.com/mobile-enterprise/blog/2015/02/mobile-wallet-uses.html, (Feb. 23, 2015), 6 pgs.

Kadambi, Kiran S., et al., "Near-Field Communication-Based Secure Mobile Payment Service", Proceedings of the 11th international Conference on Electronic Commerce, ACM, (2009), 142-151.

Pourghomi, Pardis, et al., "A Secure Cloud-Based Nfc Mobile Payment Protocol", vol. 5, (Nov. 2014), 8 pgs.

Shanbhag, Raju, "Paydiant's Cloud Mobile Wallet Receives appSecure Certification", [Online]. Retrieved from the Internet: <URL: http://it.tmcnet.com/topics/it/articles/2012/06/27/296557-paydiant-cloud-mobile-wallet-receives-appsecure-certification.htm, (Jun. 27, 2012), 2 pgs.

* cited by examiner

US 10,902,405 B1

TRANSIENT MOBILE WALLETS

TECHNICAL FIELD

Embodiments described herein generally relate to mobile wallets and, for example and without limitation, to systems and methods for providing transient mobile wallets.

BACKGROUND

Conventional mobile wallets (e.g., "digital wallets") may allow consumers to make contactless payments for products and services with mobile devices such as phones or watches in lieu of cash, credit cards, or checks. Using an antenna in the mobile device, mobile wallets may communicate with contactless readers using radio frequency such as near field communication (NFC). They may allow consumers to make secure payments in a relatively quick manner by placing their mobile devices near contactless readers at stores.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
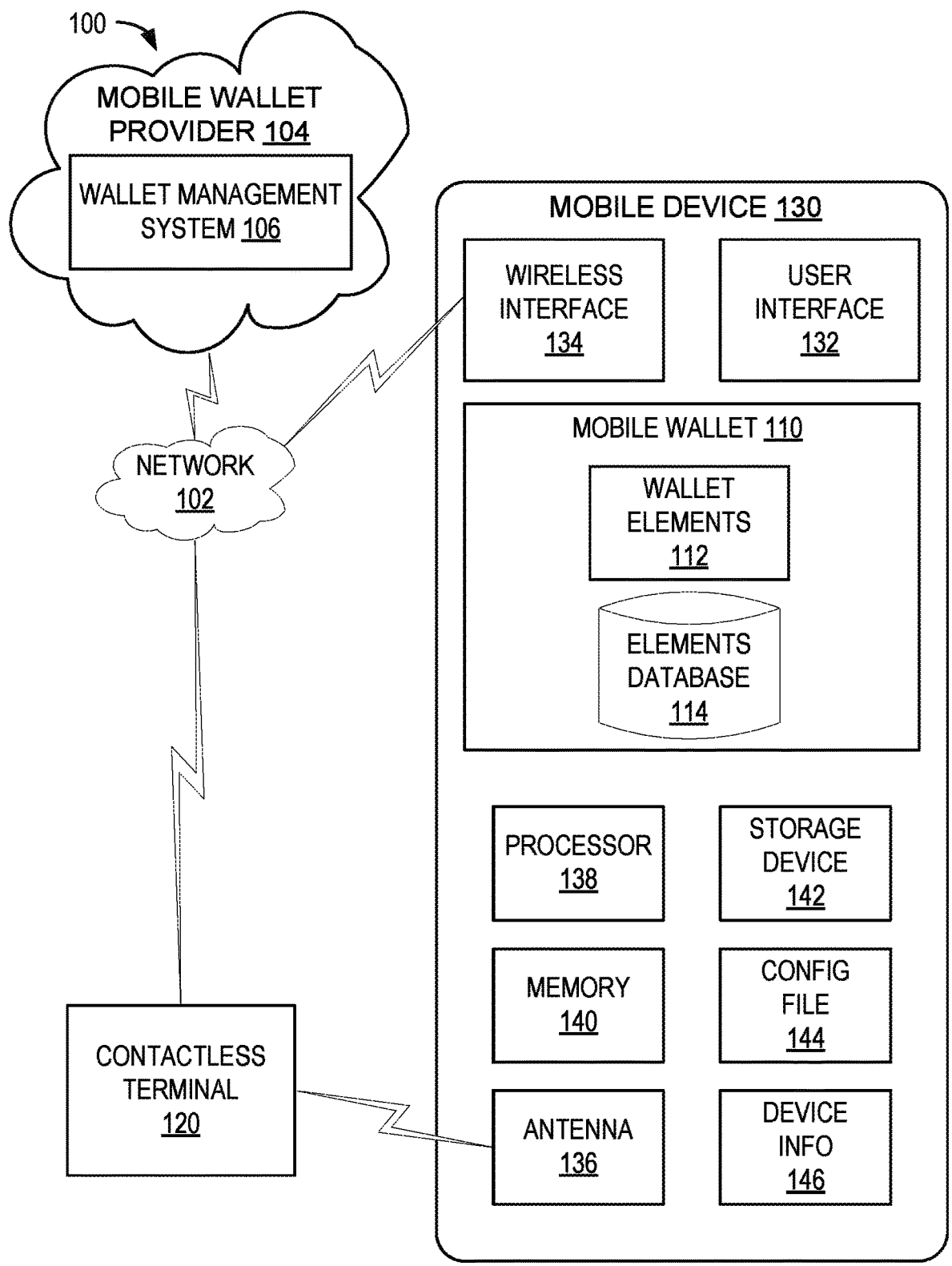
FIG. 1 illustrates an environment for using mobile wallets, according to an example embodiment.

As mobile wallets gain popularity, there is a need to provide secure methods for using mobile wallets in certain situations. The present disclosure describes a wallet management system that provides various ways for a mobile wallet provider to securely provide a transient mobile wallet (e.g., a mobile wallet with limited duration and capability) to a user. International travelers may encounter technical issues using their mobile devices ("personal devices") outside of their native countries. For example, U.S. users traveling in Europe may not have cellular network service for their primary smartphones, as their cellular network provider may not have a presence in Europe, or their devices may not be equipped to communicate with foreign transmitters, or they may experience prohibitive fees for connectivity.

To avoid such issues, some cellular service providers rent devices (e.g., cell phones, smartphones, and so forth) to users. As such, a user (e.g., a traveler) may acquire a secondary device (e.g., a transient device such as a rental smartphone) in lieu of their primary personal device, and use the various functionalities provided by the secondary device (e.g., for the duration of their trip). The user may have a mobile wallet ("primary mobile wallet"), and may regularly use the primary mobile wallet via their personal device. However, the user may not wish to configure the primary mobile wallet on the secondary device. Installing the primary mobile wallet on the secondary device may present security issues. For example, if the user forgets to uninstall the primary mobile wallet, or if the secondary device is lost or stolen, the primary mobile wallet and personal information of the user (e.g., account information, user identification information, and so forth) may be exposed to potential fraudsters.

The wallet management system described herein provides a transient mobile wallet (or just "transient wallet") for use by the user with the secondary device (e.g., a rental mobile phone). The wallet management system enables the user to set up the transient wallet with various security features tailored to the temporary nature of the device, and to the specific types of exposures such a situation brings. The transient wallet is limited to accessing only the data specifically configured with the transient wallet, thus limiting the exposure of user information and accounts while using the secondary device.

More specifically, in an example embodiment, the wallet management system enables the user to create the transient wallet by selecting data (e.g., one or more payment elements or non-payment elements) from their primary mobile wallet. The selected elements are pre-configured within the transient wallet upon creation. Further, the user configures a usage specification for the transient wallet. The usage specification identifies usage details such as, for example, effective date information (e.g., a data range when the transient wallet is effective, or an expiration date for the transient wallet), spending limitations (e.g., limits to the types of products or services that may be purchased, or limits on transaction amounts or total amounts that may be used, or geographic boundaries (e.g., cities, regions, or countries in which the transient wallet may be used), and security features (e.g., personal identification numbers (PINs) or passwords for the transient wallet, or for elements within the transient wallet).

Once configured, the wallet management system generates an identifier (ID) associated with the transient wallet. When the user acquires the secondary device, the user may install, on the secondary device, an application for the transient wallet (e.g., an application ("app") provided by a mobile wallet provider). The user may then identify the transient wallet via the app and provide a security code for accessing the transient wallet (e.g., PIN, password, or biometric authentication). Once authenticated, the transient wallet is loaded onto the secondary device, and is ready for use, subject to the restrictions defined by the usage specification.

During use of the transient wallet, the wallet management system checks attempted transactions against the usage specification. If a "non-conforming transaction" is attempted, the wallet management system prohibits the offending transaction. For example, the wallet management system may reject a transaction if the transaction is attempted outside the effective date of the transient wallet, or if the transaction payment amount exceeds a single transaction maximum, or if the transaction is attempted for a cash withdrawal when only restaurant-type merchant transactions are allowed. Further, in some embodiments, the wallet management system (e.g., the app local to the secondary device) may automatically initiate a de-installation (e.g., deactivation, or deletion) of the transient wallet on the secondary device (e.g., after a pre-determined date, or based on the effective date defined in the usage specification, or after a pre-determined number of non-conforming transactions are attempted). As such, the transient wallet may be automatically removed without direct action of the user, thereby adding additional protection of user information.

FIG. 1 illustrates an environment 100 for using mobile wallets, according to an example embodiment. The environment 100 includes a mobile wallet provider 104 working in conjunction with a mobile wallet application 110 (subsequently referred to as a mobile wallet 110) operating on a mobile device 130 (e.g., a smart phone, tablet, smart watch, or other personal computing device) of a user (not shown in FIG. 1). The mobile wallet 110 may be, for example, a digital or electronic wallet application operating on the mobile device 130, or may be an application executing on an external system (e.g., the mobile wallet provider 104).

The mobile wallet 110 may include one or more wallet elements 112 representing bank accounts (e.g., checking accounts), credit cards, debit cards, reward cards, identification cards, tickets, boarding passes, and so forth. The wallet elements 112 may, for example, be classified into payment service and non-payment service elements. Examples of payment service wallet elements include bank accounts, credit cards, debit cards, tickets, and subway passes. Examples of non-payment service wallet elements include employee cards, insurance cards, membership cards, user information, reward cards, and driver's licenses.

For each wallet element 112, the mobile device 130 may store unique account information (e.g., credentials). For a credit card, for example, the unique account information may be a device-specific device account number (DAN) and a key typically provided by a card network or a card-issuing bank. In another example, the unique account information for a credit card may be the credit card number and the account holder's name. In yet another example, the unique account information for a bank account may be the routing number and account number of a checking account of the user, check number data for the user's checking account, and any other information that may appear on the face of checks, such as the user's name, address, phone number, state-issued identifier (ID) number, and so forth.

In some embodiments, the mobile wallet 110 may use Host Card Emulation (HCE) or an equivalent function. HCE allows NFC protocol communications to be routed to a main operating system (not separately shown in FIG. 1) of the mobile device 130 rather than, for example, being routed to a local hardware-based Secure Element (SE). Further, the credentials come from outside the mobile wallet 130 securely (e.g., from the mobile wallet management system 106). For example, when the user selects a payment element 112 in the mobile wallet 110 and taps the mobile device 130 to a POS device (e.g., the contactless terminal 120), the mobile wallet 110 retrieves credentials of the selected payment element 112 from the mobile wallet management system 106 and submits the credentials to the POS device.

A transaction type may be, for example, a type of wallet element such as payment or non-payment type for the transaction. Example payment types include checks (e.g., printed checks, or electronic checks), credit cards, debit cards, and gift cards. Example non-payment types include event or concert tickets, subway passes, identification cards, user information, and so forth. A transaction type may also be a type or name of goods or services being purchased and/or type, name, or an identifier of the merchant. The mobile wallet 110 may, in some examples, send transaction authorization data (e.g., the DAN and a key), associated with the particular mobile wallet element 112 to a contactless terminal 120 in order to make a payment or make a transaction with the particular wallet item(s).

The example mobile device 130 includes a user interface 132 (e.g., touch screen) for receiving user input and displaying content to the user, a wireless interface 134 (e.g., a cellular network interface, or a Wi-Fi interface), an antenna 136 for wirelessly communicating with the contactless terminal 120 (e.g., using near field communication (NFC)), and one or more processors 138 for controlling operation of the mobile device 130 (e.g., including executing sets of instructions such as the mobile wallet 110).

The example mobile device 130 also includes a memory 140 (e.g., random access memory (RAM)), a storage device 142 (e.g., persistent storage, flash drive), configuration files 144, device-specific information 146, and a wallet elements database 114. Some data components (e.g., wallet elements 112, configuration files 144, device-specific information 146) may be stored in the memory 140 or in the storage device 142 on the mobile device 130. In some embodiments, one or more of the data components may be stored remotely (e.g., on an external server or cloud storage, not shown) and the mobile device 130 may communicate via other applications (e.g., to obtain information from the components to select wallet elements and present them to the user for selection and presentation to a point-of-sale (POS) device or directly to the POS device without further user interaction).

The configuration file 144 (e.g., a table) may contain the preferences of the user with regard to the wallet elements 112. For example, the configuration file 144 may contain a list of wallet elements to use in a priority order, generally. In another example, the configuration file 144 may contain a prioritized list of wallet elements 112 based on transaction type, based on device location and/or other criteria. For example, for a payment transaction type, the user may set a preferential order of credit or debit card wallet elements 112 to use.

The memory 140 and storage device 142 may also store device-specific information 146 such as GPS data, calendar data, time and date data, cellular network data, and Wi-Fi network data and other information specific to the mobile device 130.

The memory 140 and the storage device 142 may also store the wallet elements database 114. The wallet elements database 114 may store information on each wallet element 112. For example, the wallet elements database 114 may store an element type (e.g., payment or non-payment type) for each wallet element 112. In one example, a payment type may be associated with a checking account and a non-payment type may be associated with a student ID.

To make a payment at a merchant associated with the contactless terminal 120, for example, the user may place the mobile device 130 near the contactless terminal 120

(e.g., by tapping it with the mobile device 130 or waving the mobile device 130 in front of the terminal 120). The user may also be requested by the mobile device 130 to authenticate the payment request by biometric authentication (e.g., providing a fingerprint) or entering a PIN or code. The mobile device 130 may then wirelessly transfer unique account information (e.g., a DAN and key) for a credit card wallet element 112 to the contactless terminal 120 using near field communication (NFC).

The illustrated environment 100 includes a network 102 connecting the contactless terminal 120 and the mobile device 130 with external systems such as the mobile wallet provider 104. The network 102 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 102 may include a single local area network (LAN) or wide-area network (WAN), or combinations of LANs or WANs, such as the Internet.

In the example embodiment, the mobile wallet provider 104 includes a wallet management system 106 configured to provide mobile wallet services to the user of the mobile device 130. These mobile wallet services may include providing a primary mobile wallet to the user, as well as providing features for creating, configuring, using, and removing a "transient wallet" that may be used for temporary purposes.

Figure 2:
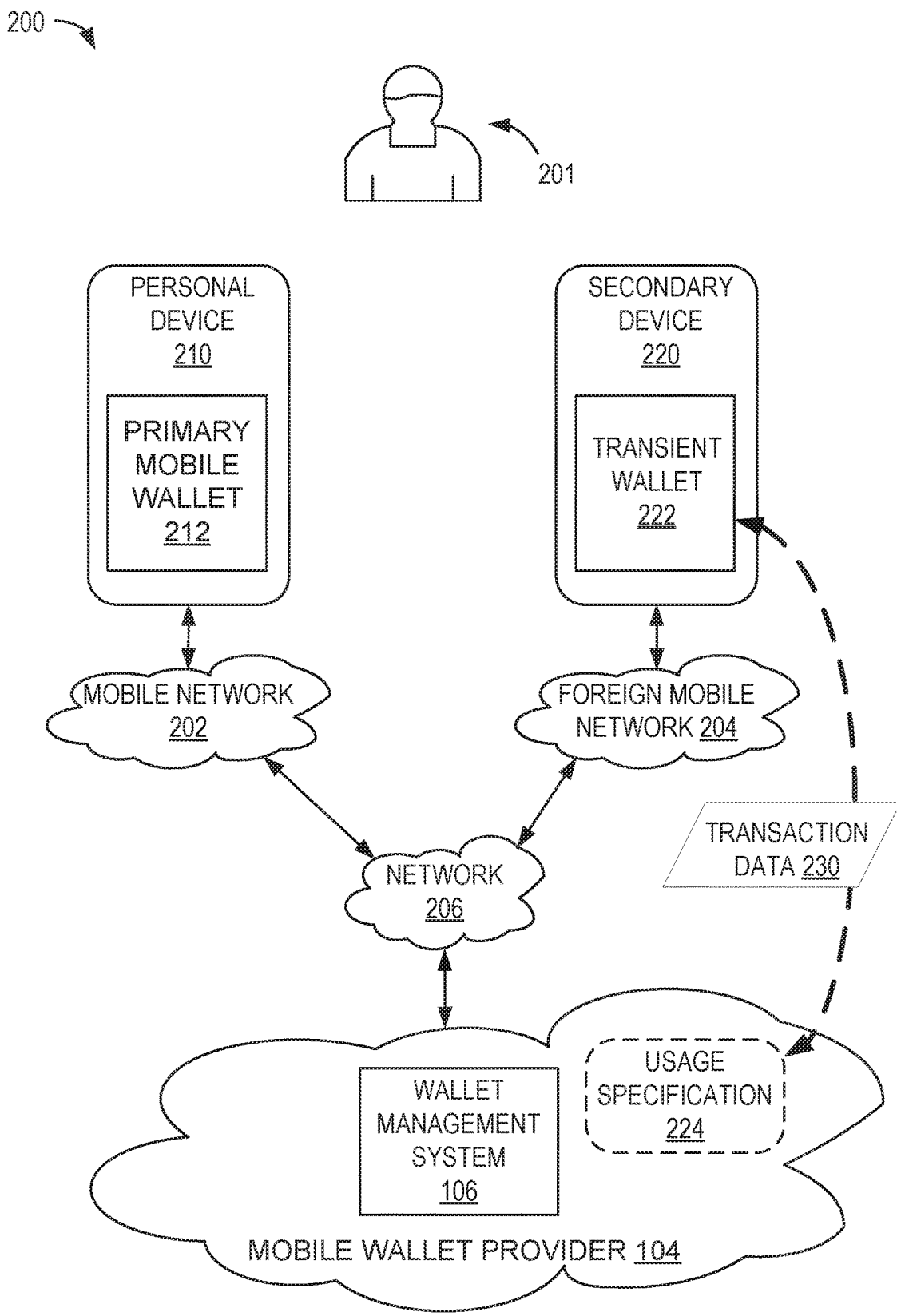
FIG. 2 illustrates a mobile wallet environment in which the wallet management system provides a transient mobile wallet to a user of a secondary device.

FIG. 2 illustrates a mobile wallet environment 200 in which the wallet management system 106 provides a transient mobile wallet 222 (subsequently referred to as a transient wallet 222) to a user 201 of a secondary device 220 (e.g., a transient device, such as a rental smartphone). In an example embodiment, the user 201 has a personal device 210 that the user 201 uses on a daily basis (e.g., a smartphone or tablet computing device, through a mobile network 202 and a network 206 (e.g., the Internet)). Further, the user 201 also has established a mobile wallet 212 (subsequently referred to as a primary mobile wallet 212) provided by the mobile wallet provider 104. The personal device 210 and secondary device 220 may be similar to the mobile device 130, and the primary mobile wallet 212 and transient wallet 222 may be similar to the mobile wallet 110. The user 201 may use the personal device 210 and the primary mobile wallet 212 during typical consumer activities, such as paying for goods and services using payment elements (e.g., payment cards) stored in the primary mobile wallet 212.

In some situations, the user 201 may have cause to need use of the secondary device 220 (e.g., in lieu of, or in the absence of, the personal device 210). For example, the user 201 may travel abroad and, as such, the personal device 210 may not be with the user 201, or may not be usable during their travels (e.g., may be incompatible with a foreign mobile network 204, or may be cost-prohibitive to use). The user 201 may, for example, rent the secondary device 220 for use while at their travel destination, or the user 201 may borrow the secondary device 220 from an acquaintance In such situations, the secondary device 220 may be treated by the user 201 with some suspicion, as the user 201 does not own the secondary device 220 and, as such, expects to relinquish control of the secondary device 220 at some point. As such, the user 201 may not wish to load their primary mobile wallet 212 onto the secondary device 220. This may entail "trusting" the secondary device 220 with too much information of the user 201, such as data associated with all of the payment and non-payment elements loaded in the primary mobile wallet 212, and all of the personal information of the user 201 loaded in the primary mobile wallet 212.

To avoid such exposures, the wallet management system 106 enables the user 201 to create and configure the transient wallet 222 with limited use and limited duration. The user 201 may configure the transient wallet 222 with payment and non-payment elements from the primary mobile wallet 212, and with a usage specification 224 that limits the use of the transient wallet 222. For example, the user 201 may configure the transient wallet 222 with only certain wallet elements 112 (e.g., only a single, low-limit credit card), or may set the transient wallet 222 to only be usable at particular types of merchants (e.g., only usable for restaurant or fuel purchases), or may set a transaction amount limit (e.g., maximum single transition limit of $50, maximum total transactions limit of $200), or may only be used in specified geographic regions (e.g., based on GPS location information of the secondary device 220). Further, the user 201 may also configure the transient wallet 222 to be active only during a certain timeframe (e.g., during the week they know they will be at their travel destination, or up until the last day of their travel). Use of the transient wallet 222 may provide security benefits relative to loading the primary mobile wallet 212 onto the secondary device 220.

The wallet management system 106 creates the transient wallet 222 with a unique wallet ID. The user 201 may identify one or more wallet elements 112 from the primary mobile wallet 212 to be added to the transient wallet 222, or the user 201 may add one or more wallet elements 112 not in the primary mobile wallet 212. The wallet management system 106 also configures the transient wallet 222 with the usage specification 224 defined by the user 201.

In the example embodiment, once configured and activated by the user 201, the transient wallet 222 is loaded onto the secondary device 220 (e.g., with the appropriate mobile wallet application of the mobile wallet provider 104). The transient wallet 222 may be used as provided by the mobile wallet application of the mobile wallet provider 104, but subject to the usage specification 224. For example, during each transaction involving the transient wallet 222, the wallet management system 106 may operate in conjunction with the transient wallet 222 to restrict transactions based on the usage specification 224 defined for the transient wallet 222. Transactions that conflict with the usage specification 224 (referred to herein as non-conforming transactions) are rejected. For example, if a transaction is attempted with the transient wallet 222 after the effective date of the transient wallet 222, or if the transaction has a payment amount greater than the single transaction threshold, then the transaction is non-conforming and, as such, is rejected.

In the example embodiment, the usage specification 224 is applied in whole by the wallet management system 106 (e.g., server-side implementation, at the mobile wallet provider 104). For example, during a payment transaction, the transient wallet 222 may send transaction data 230 to the wallet management system 106 (e.g., purchase amount, vendor identifier, payment element information, and so forth). In addition to other conventional payment authorization steps, the wallet management system 106 applies the usage specification 224 to the transaction (e.g., prior to payment authorization), and may use one or more of the elements of the transaction data 230 to apply the usage specification 224. In other embodiments, the usage specification 224 may be applied in whole by the secondary device 220 (e.g., client-side implementation, prior to sending the transaction data 230 for payment authorization). For example, the usage specification 224 may be uploaded to the secondary device 220 and applied by the transient wallet 222 (e.g., by the mobile wallet application of the mobile wallet provider 104). In still other embodiments, application of the usage specification 224 may be performed by both the wallet management system 106 and the secondary device 220 (e.g., mixed implementation). For example, some components of the usage specification 224 may be uploaded and enforced by the secondary device 220 (e.g., effective date, or PIN/ password authentication), while other components of the usage specification 224 may be enforced by the wallet management system 106 (e.g., geographic boundaries, permissible vendors, or types of products or services).

Once the user 201 no longer needs the secondary device 220, the user 201 may de-install the transient wallet 222 (e.g., manually). In some situations, the owner of the secondary device 220 (e.g., a vendor renting the secondary device 220 to the user 201) may clear the memory of the secondary device 220 prior to re-deploying the device 220.

In some embodiments, the transient wallet 222 may be automatically removed. More specifically, the usage specification 224 may identify an expiration date for the transient wallet 222. The expiration date is a date at or after which the transient wallet 222 is automatically de-installed, deleted, or otherwise deactivated. As an additional safety precaution, the wallet management system 106 and/or the secondary device 220 (e.g., the mobile wallet app on the secondary device 220) may be configured to cause the transient wallet 222 to be automatically de-installed from the secondary device 220 after the expiration date has passed. For example, the user 201 may forget to remove the transient wallet 222 after returning the secondary device 220, or the secondary device 220 may be stolen, or reassigned to another user without having its memory cleared. The automatic removal of the transient wallet 222 helps limit the exposure of whatever data (e.g., payment elements, user information) was in the transient wallet 222 by automatically removing the transient wallet 222 after the pre-defined expiration time.

Figure 3:
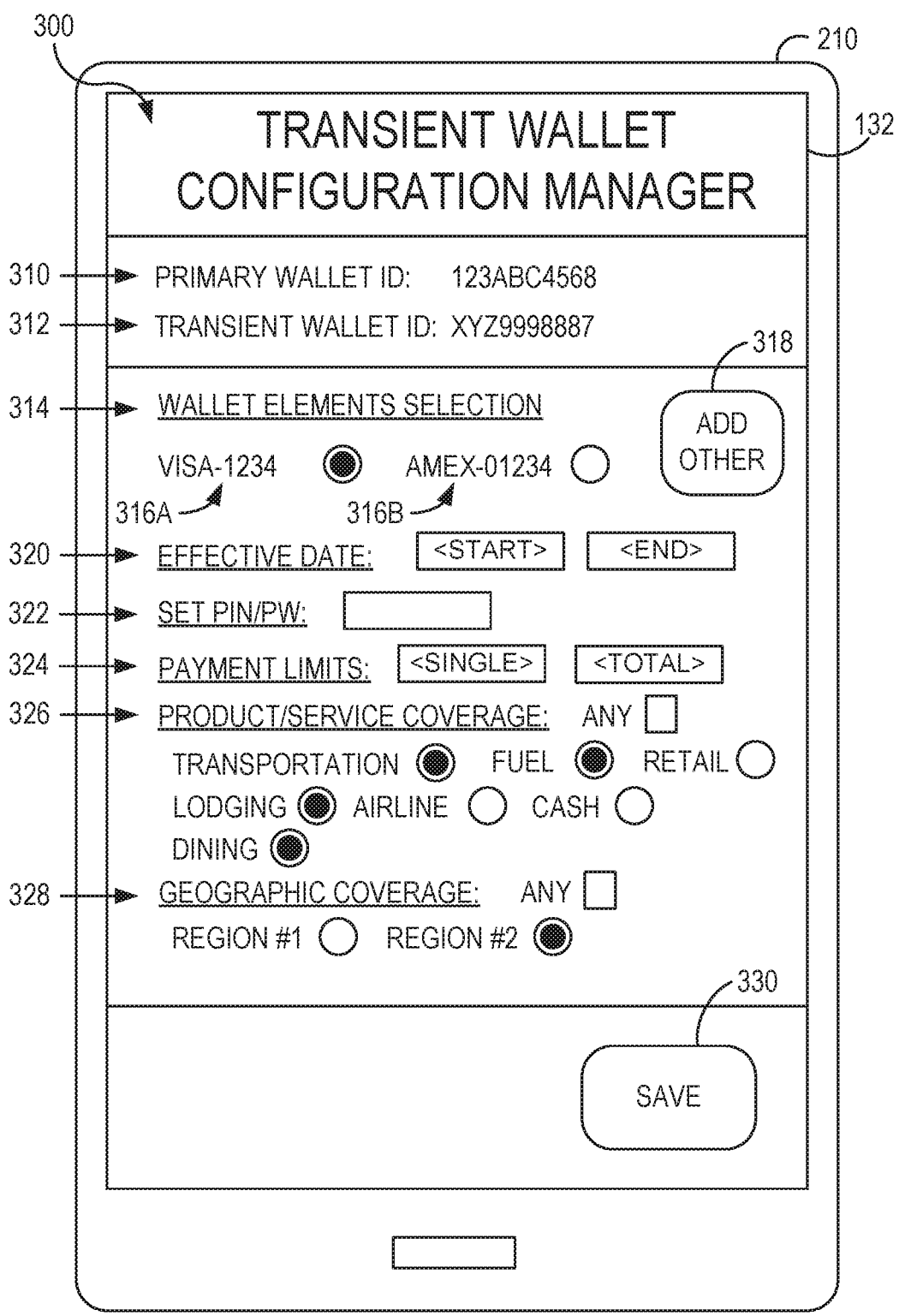
FIG. 3 is an example illustration of a graphical user interface for a configuration manager screen in which the user configures the usage specification for the transient wallet.

FIG. 3 is an example illustration of a graphical user interface (GUI) for a configuration manager screen 300 in which the user 201 configures the usage specification 224 for the transient wallet 222. In the example embodiment, the wallet management system 106 (e.g., via the mobile wallet application of the mobile wallet provider 104) presents the configuration manager screen 300 on the user interface 132 of the mobile device 130 (e.g., the personal device 210 of the user 201). The configuration manager screen 300 enables the user 201 to configure various components of the usage specification 224 for the transient wallet 222.

In the example embodiment, the configuration manager screen 300 displays a primary wallet ID 310 (e.g., identifying the primary mobile wallet 212 of the user 201, as assigned by the mobile wallet provider 104). Further, the configuration manager screen 300 also displays a transient wallet ID 312. The transient wallet ID 312 is an identifier (e.g., similar to the primary wallet ID 310) assigned to the transient wallet 222 at the time of creation. The user 201 uses the transient wallet ID 312 to identify the transient wallet 222 when initially loading the transient wallet 222 into the secondary device 220, as described in further detail below with respect to FIG. 4.

In addition, the configuration manager screen 300 displays multiple components of the usage specification 224 and enables the user 201 to configure those components. More specifically, in this example embodiment, the components of the usage specification 224 include a wallet elements selection 314, an effective date selection 320, an authentication selection 322, a payment limits selection 324, a transaction type coverage selection 326, and a geographic coverage selection 328. In some embodiments, the configuration manager screen 300 may allow users to enable remote deletion or disablement of the contents in the transient wallet 222 remotely (e.g., by accessing the wallet provider's web site).

The wallet elements selection 314 may include one or more wallet elements 112 (e.g., payment elements 316A, 316B) from the primary mobile wallet 212 of the user 201. The user 201 may select which, if any, of the wallet elements 112 they wish to load into the transient wallet 222. In the example embodiment, the user 201 has selected payment element 316A, but not payment element 316B. The wallet elements selection 314 also includes an "add other" button 318, which enables the user 201 to add wallet elements 112 not in the primary mobile wallet 212 of the user 201. For example, to protect the wallet elements 112 of the user 201, the user 201 may acquire a debit card with a fixed amount of funds, and may load that debit card (e.g., as a payment element) into the transient wallet 222 by providing the account information using the "add other" button 318. As such, the wallet management system 106 enables the user 201 to control which wallet elements 112 are loaded into the transient wallet 222. Accordingly, only the identified wallet elements 112 are usable and exposed through the transient wallet 222.

The effective date selection 320 identifies date or time information that controls when the transient wallet 222 may be used. In the example embodiment, the configuration manager screen 300 includes input boxes for <start> and <end> dates (e.g., an effective date range). For example, if the user 201 knows they are going to be on vacation abroad in the first week of July (e.g., July 1 through Jul. 7, 2016), the user 201 may identify the effective <start> date as Jul. 1, 2016, and the effective <end> date as Jul. 7, 2016. Any transactions attempted by the transient wallet 222 outside of that effective date range may be rejected as non-conforming based at least on the effective date range. In other embodiments, the effective date selection 320 may include only an effective <end> date (e.g., a date cutoff), or only an effective <start> date (e.g., an initial date). Any transactions attempted after the effective <end> date, or before the effective <start> date, respectively, may be rejected as non-conforming. In some embodiments, any of the components of the effective date selection 320 may include both date and time information (e.g., 07:00 AM Jul. 1, 2016). In some embodiments, the effective date selection 320 may include an effective duration (e.g., a length of time). For example, the user 201 may provide an effective duration of 14 days and, as such, transaction attempts after the effective duration may be rejected as non-conforming. The effective duration may be determined based on the creation date/time of the transient wallet 222, or based on the time at which the user 201 configured (e.g., entered and saved) the effective duration, or based on the time at which the user 201 activates the transient wallet 222.

The authentication selection 322 receives an authentication token from the user 201. The authentication token may include a PIN, or a password, or a biometric token (e.g., a fingerprint scan). In the example embodiment, the user 201 enters a password as the authentication token in the authentication selection 322. The authentication token may subsequently be used to activate the transient wallet 222, or to access the transient wallet 222, or to perform a transaction using the transient wallet 222 (e.g., as a component of the transaction data 230). As such, the authentication token provides an additional layer of security for the transient wallet 222.

The payment limits selection 324 identifies restrictions on payment transactions attempted or performed using the transient wallet 222. The wallet management system 106 may reject attempted transactions if the attempted transactions do not conform to the payment limits selection 324. In the example embodiment, the payment limits selection 324 includes a <single> transaction limit and a <total> transaction limit (e.g., each of which may be in a unit of currency, such as U.S. dollars). The <single> transaction limit identifies an upper limit to a payment amount for a single transaction. For example, the user 201 may set the <single> transaction limit to $200. As such, if a single transaction is attempted for a payment amount of $500, the transaction may be rejected as non-conforming because the payment amount exceeds the <single> transaction limit. The <total> transaction limit identifies an upper limit for all transactions performed using the transient wallet 222 (e.g., in total). For example, presume the <total> transaction limit is set to $300. A first transaction for $150 may be approved, but a second, subsequent transaction for $200 may be rejected because the second transaction causes the total payment amounts of the transactions (e.g., $150+$200=$350) to exceed the <total> transaction limit of $300.

The transaction type coverage selection 326 identifies what types of transactions may be allowed through the transient wallet 222. Transaction types for a particular payment transaction may be identified by merchant information (e.g., merchant category codes defined by payment card companies and associated with various merchants). The wallet management system 106 may reject transactions if the attempted transaction is with a merchant that does not meet an allowed transaction type. In the example embodiment, the transaction type coverage selection 326 includes options for limiting transaction types based on categories of "transportation," "fuel," "retail," "lodging," "airline," "cash" (e.g., automated teller machine cash withdrawals), and "dining." The user 201 may select or unselect any or all of the transaction types, where selecting the transaction type configures the transient wallet 222 to allow transactions from that type of merchant. The transaction type coverage selection 326 also includes an "any" box. The "any" box is a toggle setting which, when selected (e.g., checked), may override any of the individual transaction types and allows transactions for any (e.g., all) type of merchants. In other words, if the "any" box is checked, then the transient wallet 222 does not limit transactions based on transaction type, and if the "any" box is unchecked, then the transient wallet 222 limits transactions based on which individual transaction types are selected in the transaction type coverage selection 326.

Similar to the transaction type coverage selection 326, the geographic coverage selection 328 identifies geographic locations (e.g., regions) from which transactions may be originated using the transient wallet 222. Geographic locations of particular transactions may be identified, for example, by merchant information (e.g., the merchant's storefront zip code or address), or POS device information (e.g., a zip code or address associated with a POS device used during the transaction), or location information provided by a global positioning system (GPS) receiver of the secondary device 220 captured at the time of the transaction. The wallet management system 106 may reject transactions if the attempted transaction is not within an identified geographic region. In the example embodiment, the geographic coverage selection 328 provides two regions, "region #1" and "region #2" selectable by the user 201. These regions may be defined by, for example, postal zip codes, cities, states or provinces, or countries. In other embodiments, the geographic coverage selection 328 may provide input boxes for any of the types of region definitions (e.g., a country code input, a drop-down menu of city names within a particular country, a zip code input box, and so forth). As such, the user 201 may select or unselect any or all of the displayed regions, or may input one or more regions, where selecting the region configures the transient wallet 222 to allow transactions that originate from merchants within that region. The geographic coverage selection 328 also includes an "any" box. The "any" box is a toggle setting which, when selected (e.g., checked), may override any of the individual regions and allows transactions for any (e.g., all) regions. In other words, if the "any" box is checked, then the transient wallet 222 does not limit transactions based on the origin of the transaction, and if the "any" box is unchecked, then the transient wallet 222 limits transactions based on which individual regions are selected in the geographic coverage selection 328.

In some embodiments, both the primary mobile wallet 212 and the transient wallet 222 may be active at the same time (e.g., either wallet 212, 222 may be used by the user 201). In other embodiments, only one of the wallets 212, 222 may be active at any one time. For example, the configuration manager screen 300 may enable the user 201 to identify which wallet 212, 222 is active and which is inactive (e.g., temporarily disabled). In some embodiments, the mobile wallet provider 104 may mandate that only one of the wallets 212, 222 may be active at any time. For example, the mobile wallet provider 104 may automatically disable the primary mobile wallet 212 when the transient wallet 222 becomes active. In situations in which the user 201 may need a secondary device 220 and transient wallet 222, the user 201 may not have direct control of their personal device 210 (e.g., they may have left the personal device 210 at home, or may have lost it). As such, this feature enables only one of the wallets 212, 222 to be active (e.g., used) at any given time.

In other embodiments, the configuration manager screen 300 may include input selection sections for any component of the usage specification 224. For example, the usage specification 224 may include a "one time use" or "multiple use" field which may be used to limit the transient wallet 222 to just a single use (e.g., a single transaction), or a "number of uses" field which may limit the transient wallet 222 to a pre-defined number of uses (e.g., up to 5 transactions).

Once the user 201 has selected the various components of the usage specification 224 on the configuration manager screen 300, the user 201 clicks a save button 330, which causes the wallet management system 106 to store the usage specification 224 (e.g., on the wallet management system 106). At this stage, in the example embodiment, the transient wallet 222 has not yet been "activated" and, as such, is not yet usable.

Figure 4:
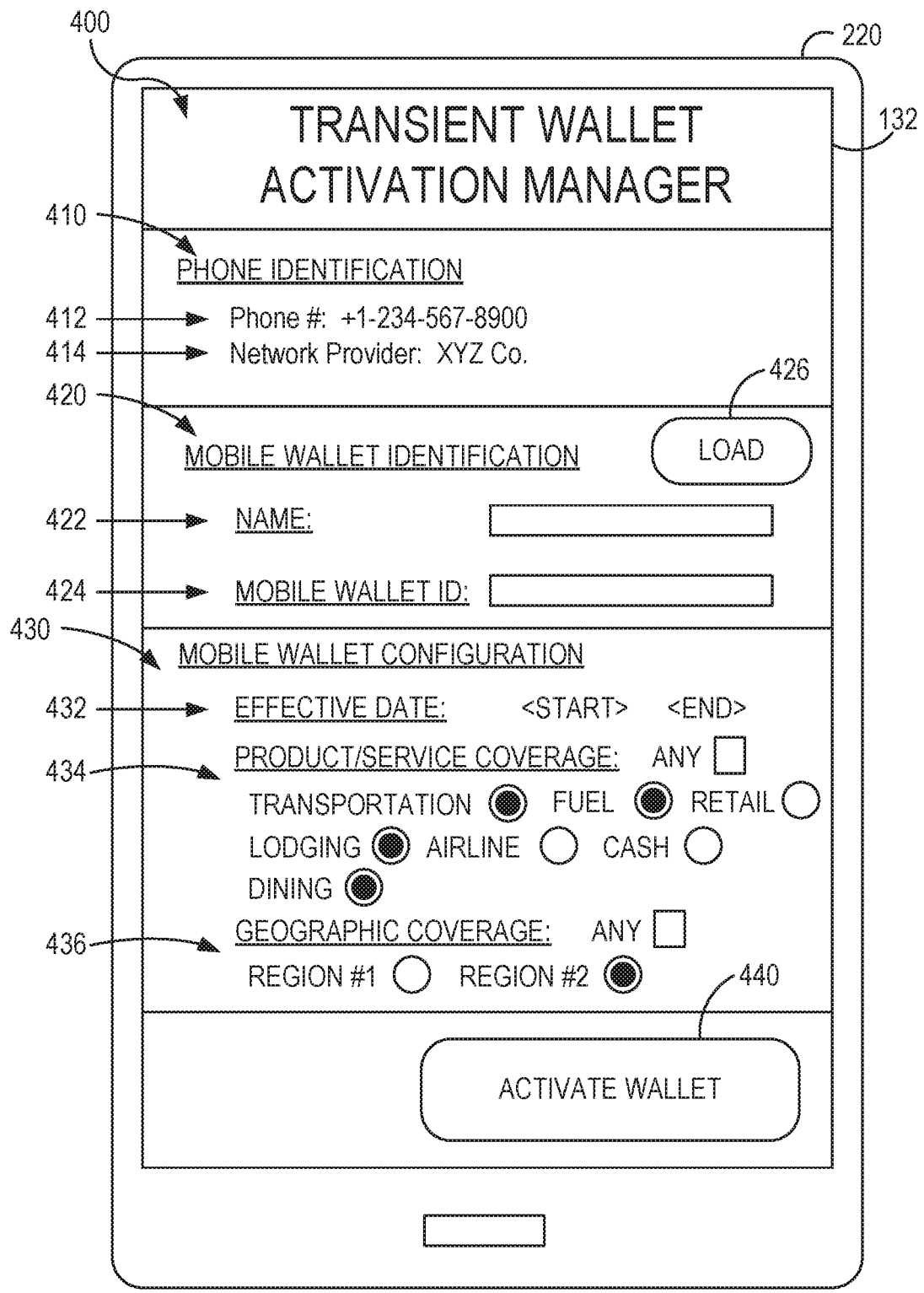
FIG. 4 is an example illustration of a graphical user interface for an activation manager screen in which the user activates the transient wallet on the secondary device.

FIG. 4 is an example illustration of a graphical user interface (GUI) for an activation manager screen 400 in which the user 201 activates the transient wallet 222 on the secondary device 220. In the example embodiment, the wallet management system 106 (e.g., via the mobile wallet application of the mobile wallet provider 104) presents the activation manager screen 400 on the user interface 132 of the mobile device 130 (e.g., the secondary device 220). The activation manager screen 400 enables the user 201 to identify the transient wallet 222, and optionally to modify some or all of the usage specification 224 prior to or at the time of activation.

In the example embodiment, the activation manager screen 400 displays phone identification information 410 for the secondary device 220. The phone identification information 410 includes a phone number 412 of the secondary device 220 and a network provider 414 (e.g., cell carrier). The activation manager screen 400 also includes a mobile wallet identification section 420. The mobile wallet identification section 420 includes a name field 422, a mobile wallet ID field 424, and a "load" button 426. During operation, the user 201 enters their name in the name field 422, the transient wallet ID 312 in the mobile wallet ID field 424, and clicks the "load" button 426. The secondary device 220 (e.g., the mobile wallet application running on the secondary device 220) submits a wallet access request to the wallet management system 106, including data from the name field 422 and the mobile wallet ID field 424. In some embodiments, the user 201 may also be prompted to enter an authentication token (e.g., the PIN, password, or biometric entered as the authentication selection 322). The wallet management system 106 may authenticate the access request to the transient wallet 222 based on the authentication token. In response to a valid access request, the wallet management system 106 transmits some or all of the usage specification 224 for the identified transient wallet 222 to the secondary device 220.

After the usage specification 224 is received in response to the access request, the activation manager screen 400 displays one or more components of the usage specification 224 in a mobile wallet configuration section 430. In the example embodiment, the mobile wallet configuration section 430 includes an effective date area 432, a transaction type coverage area 434, and a geographic coverage selection area 436. The effective date area 432 displays the <start> and <end> dates configured by the user 201 in the effective date selection 320, and is a read-only field (e.g., not editable through the activation manager screen 400). The transaction type coverage area 434 is similar to the transaction type coverage selection 326, having the transaction types marked as configured by the user 201 in the transaction type coverage selection 326, and is editable (e.g., the user 201 may select or deselect any of the elements within this area 434). The geographic coverage selection area 436 is similar to the geographic coverage selection 328, having the geographic regions marked as configured by the user 201 in the geographic coverage selection 328, and is also editable.

In some embodiments, other components of the usage specification 224 may be displayed on the activation manager screen 400 (e.g., after loading). Further, in some embodiments, any of the displayed components of the usage specification 224 may be read-only, or may be editable.

Once the user 201 has viewed, and optionally edited, the displayed components of the usage specification 224 in the wallet configuration section 430, the user 201 clicks an activate wallet button 440 provided on the activation manager screen 400. Upon receiving an indication of this activation button click, the secondary device 220 transmits an activation request to the wallet management system 106 to activate the transient wallet 222. The activation request may include any edited components of the usage specification 224. The wallet management system 106 may store any of the edited components of the usage specification 224. In some embodiments, the user 201 may be prompted for an authentication token during activation (e.g., instead of, or in addition to, the prompting during the load process).

In response to the activation request, the wallet management system 106 activates the transient wallet 222 for use. In some embodiments, the activation request may also include a hardware ID associated with the secondary device 220. The hardware ID may be stored as a part of the usage specification 224, and may be used to limit use of the transient wallet 222 to that secondary device 220. As such, the activation process may "bind" the transient wallet 222 to the secondary device 220, thereby further securing the transient wallet 222 from other potentially fraudulent use (e.g., by a fraudster attempting to use the transient wallet 222 on another device).

Once activated, the transient wallet 222 may be used (e.g., for payment transactions). The transient wallet 222 has access to any of the wallet elements 112 as defined by the user 201 in the wallet elements selection 314. In the example embodiment, data (e.g., payment card account numbers) associated with the wallet elements 112 allowed by the usage specification 224 are loaded onto the secondary device 220 with the usage specification (e.g., during the "load"). In other embodiments, the wallet element data is sent only after a successful activation process is completed.

Figure 5:
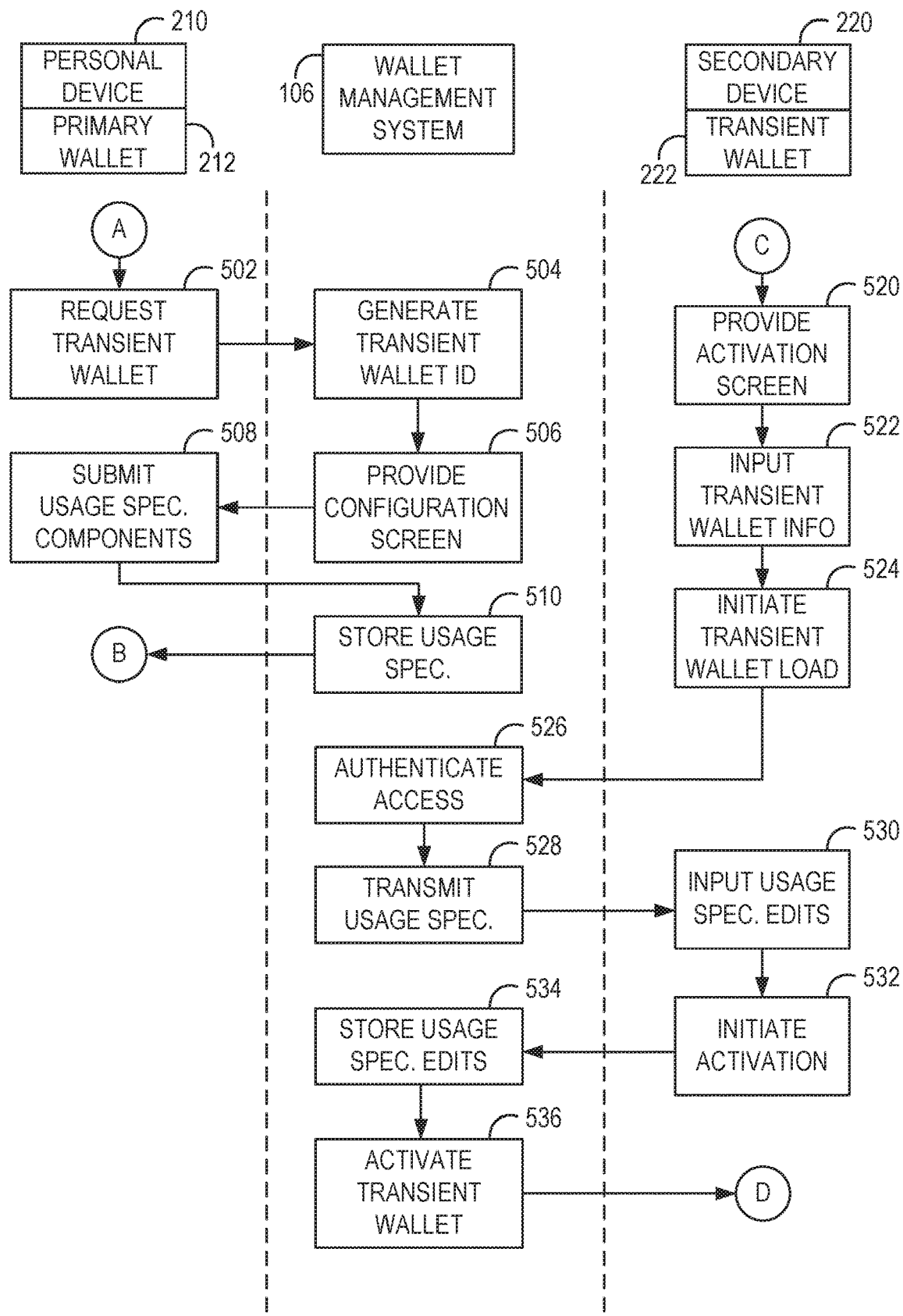
FIG. 5 is an example swim lane diagram illustrating a method for configuring and activating the transient wallet using the configuration manager screen and the activation manager screen.

FIG. 5 is an example swim lane diagram illustrating a method 500 for configuring and activating the transient wallet 222 using the configuration manager screen 300 and the activation manager screen 400. In the example embodiment, and beginning at "A", the personal device 210 (e.g., via the mobile wallet application installed on the personal device 210) requests creation of a new transient wallet from the wallet management system 106 (see operation 502). The wallet management system 106 generates the transient wallet ID 312 (see operation 504) and provides the configuration manager screen 300 to the user 201 via the user interface 132 of the personal device 210 (see operation 506). The user 201 configures the various components of the usage specification 224 for the transient wallet 222 and submits the usage specification 224 to the wallet management system 106 (see operation 508). The wallet management system 106 stores the usage specification 224 for the transient wallet 222, associating the transient wallet 222 with the usage specification 224 by the transient wallet ID 312 (see operation 510), ending the configuration at "B."

The user 201 acquires the secondary device 220 (e.g., via rental or borrowing) and begins the installation of the transient wallet 222 on the secondary device 220 at "C." The secondary device 220 (e.g., via the mobile wallet application installed on the secondary device 220) provides the activation manager screen 400 to the user 201 via the display interface 132 of the secondary device 220 (see operation 520). The user 201 inputs the transient wallet information (e.g., the name of the user 201, the transient wallet ID 312, and the authentication token for the transient wallet 222) into the activation manager screen 400 (see operation 522) and initiates a load of the transient wallet 222 (see operation 524).

The wallet management system 106 receives the request and authenticates access to the transient wallet 222 using the transient wallet information (see operation 526). If the authentication is successful, the wallet management system 106 transmits some or all of the usage specification 224 for the transient wallet 222 to the secondary device 220 in response to the load request (see operation 528). The secondary device 220 displays some or all of the components of the usage specification 224 on the activation manager screen 400 (e.g., in the wallet configuration section 430), and may enable the user 201 to input (e.g., modify) one or more of the components through the wallet configuration section 430 (see operation 530).

The user 201 initiates activation of the transient wallet 222 (see operation 532). The secondary device 220 may transmit one or more edited components of the usage specification 224 to the wallet management system 106 along with an activation request for the transient wallet 222 (see operation 534). The wallet management system 106 activates the transient wallet 222 for use (see operation 536), ending the activation process at "D."

Figure 6:
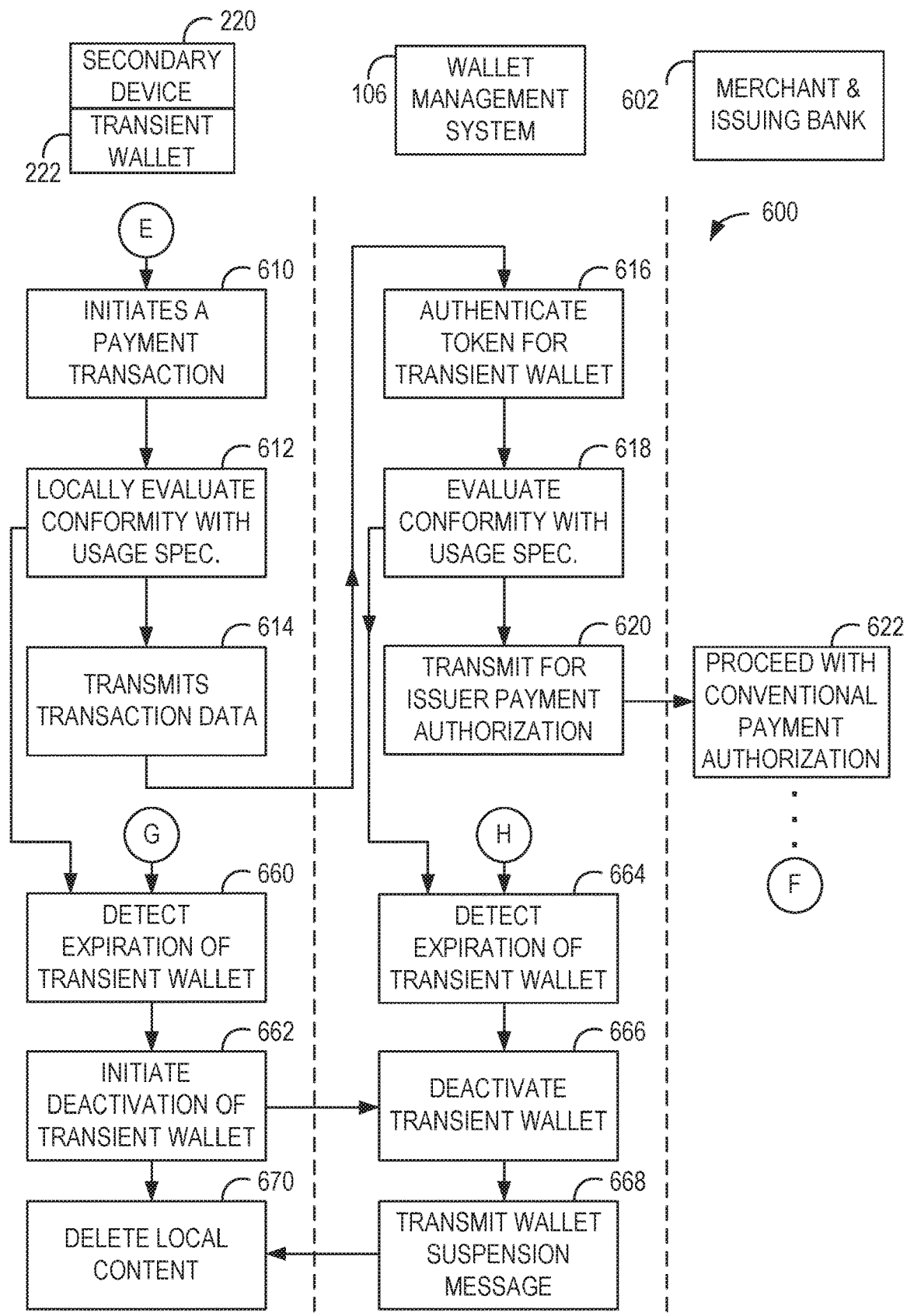
FIG. 6 is an example swim lane diagram illustrating a method for using the transient wallet during a purchase transaction, and for automatically de-activating the transient wallet.

FIG. 6 is an example swim lane diagram illustrating a method 600 for using the transient wallet 222 during a purchase transaction, and for automatically de-activating the transient wallet 222. In the example embodiment, and beginning at "E," the secondary device 220 (e.g., via the transient wallet 222) initiates a payment transaction (e.g., with a merchant) (see operation 610). In some embodiments, the secondary device 220 receives transaction data 230 associated with the payment transaction (e.g., invoice data from a POS device of the merchant), and the secondary device 220 may perform local evaluation of the transaction using the invoice data, as described below. In other embodiments, the secondary device 220 may not receive transaction data 230.

In some embodiments, the secondary device 220 includes one or more components of the usage specification 224 and performs a local evaluation of those components of the usage specification 224 for conformity (see operation 612). For example, the secondary device 220 may include the effective <start> date and the effective <end> date of the transient wallet 222 and may compare this component to the date of the payment transaction (e.g., the current date/time). If the secondary device 220 determines that the payment transaction does not conform with the usage specification 224 (e.g., the subset of the usage specification 224), then the secondary device 220 may reject the payment transaction.

Further, in some embodiments, some non-conforming attempted transactions may cause the secondary device 220 to automatically initiate deactivation of the transient wallet 222 (e.g., branching down to operation 660). Certain components of the usage specification 224 may be configured as "deactivation criteria," or components which cause deactivation of the transient wallet 222 when a payment transaction is received that does not conform with those components. For example, a transaction attempt outside of the effective date may cause the secondary device 220 to automatically initiate deactivation of the transient wallet 222 (e.g., deactivation criterion is a transaction occurring outside of the effective date, automatically removing the transient wallet 222 and associated data from the secondary device 220 as a precautionary measure).

If the payment transaction is found to be conforming (e.g., based on the subset of the usage specification 224), then the secondary device 220 transmits the transaction data 230 to the wallet management system 106 (see operation 614). In the example embodiment, the wallet management system 106 authenticates the transaction using the authentication token (see operation 616), and evaluates the transaction data 230 against the usage specification 224 to determine whether or not the transaction conforms (see operation 618). In some embodiments, if the transaction does not conform, then the transaction is rejected and a transaction rejection message is sent to the secondary device 220, or to the merchant and issuing bank 602 (e.g., to the POS device used in the transaction). If the transaction conforms, then the wallet management system 106 transmits the transaction data 230 to the merchant and issuing bank 602 for processing (see operations 620 and 622), ending at "F," with the payment transaction either approved or disapproved (e.g., by the issuing bank). In other words, the wallet management system 106 acts to determine conformity using the usage specification 224 prior to the normal payment authorization process and, if conforming, the normal payment authorization process is allowed to proceed (e.g., transmitting payment account information to the merchant, then on from the merchant to a merchant bank, to issuing bank, and back).

In some embodiments, certain types of non-conforming transactions may trigger the wallet management system 106 to automatically uninstall, delete, deactivate, or otherwise disable the transient wallet 222 (e.g., based on deactivation criteria, branching from operation 618 to operation 664). For example, if the user 201 provides an improper PIN or password three times (e.g., deactivation criterion is not successfully providing the authentication token), or if the transaction is attempted for a cash advance when cash advances are prohibited (e.g., deactivation criterion is attempting a "cash" transaction when the "cash" transaction type coverage is not allowed), or if the transaction is attempted with a merchant in a non-confirming region (e.g., deactivation criterion is attempting a transaction in an unapproved country), then the wallet management system 106 may automatically initiate deactivation of the transient wallet 222.

Operations 660-670 illustrate multiple example embodiments for automatic deactivation of the transient wallet 222. Starting at "G" (or branching down from operation 612), the secondary device 220 may initiate the deactivation of the transient wallet 222. More specifically, the secondary device 220 detects expiration of the transient wallet 222 (see operation 660). This may occur in any of multiple ways. One example, as described above, is detecting certain non-conforming types of attempted transactions (e.g., branching down from operation 612 to operation 660). For another example, the secondary device 220 may be configured to periodically check the effective date selection 320 from the usage specification 224 based on the current date. If the current date is after the <end> date, then the secondary device 220 has detected the expiration of the transient wallet 222. In yet another example, the secondary device 220 may be configured to periodically determine location data of the secondary device 220 (e.g., via a global positioning system (GPS) receiver (not shown) integrated into the secondary device 220). If, after activation, the secondary device 220 detects that the secondary device 220 is not in an approved region (e.g., based on the usage specification 224), then the secondary device 220 has detected the expiration of the transient wallet 222. Upon any of these secondary device-based "automatic expiration conditions," the secondary device 220 initiates deactivation of the transient wallet 222 (e.g., transmits a deactivation message) with the wallet management system 106 (see operation 662).

Starting at "H," the wallet management system 106 may initiate the deactivation of the transient wallet 222. More specifically, the wallet management system 106 detects expiration of the transient wallet 222 (see operation 664). This may occur in any of multiple ways. One example, as described above, is detecting certain non-conforming types of attempted transactions (e.g., branching down from operation 618 to operation 664). For another example, any of the above-described automatic expiration conditions may also be performed by the wallet management system 106. For another example, the wallet management system 106 may receive indication that the payment transaction has been declined by the issuing bank, and may automatically initiate deactivation of the transient wallet 222 based on that decline (e.g., if a returned decline code indicates a fraudulent payment element, or an inactive payment element, or a "pick up card"). Upon any of these wallet management system-based automatic expiration conditions, the wallet management system 106 initiates deactivation of the transient wallet 222 (see operation 666).

In some embodiments, the user 201 may initiate deactivation of the transient wallet 222 before the configured expiration date (e.g., if the user 201 returns earlier than originally planned). For example, the user 201 may deactivate the transient wallet 222 using the personal device 210 or the secondary device 220 (e.g., through an additional button on the configuration manager screen 300 or the activation manager screen 400).

Whether secondary device-based initiation (from operation 662), or wallet management system-based initiation (from operation 664), or user-based deactivation (not separately shown), the wallet management system 106 deactivates the transient wallet 222 (see operation 666). Further, the wallet management system 106 transmits a wallet suspension message to the secondary device 220 (see operation 668). The secondary device 220 deletes any local content for the transient wallet 222 on the secondary device 220, effectively removing the transient wallet 222 from the secondary device 220 (see operation 670). In some embodiments, the deletion function may be embedded in the transient wallet 222 and may be triggered externally (e.g., from the mobile wallet management system 106, or from the personal device 210).

Figure 7:
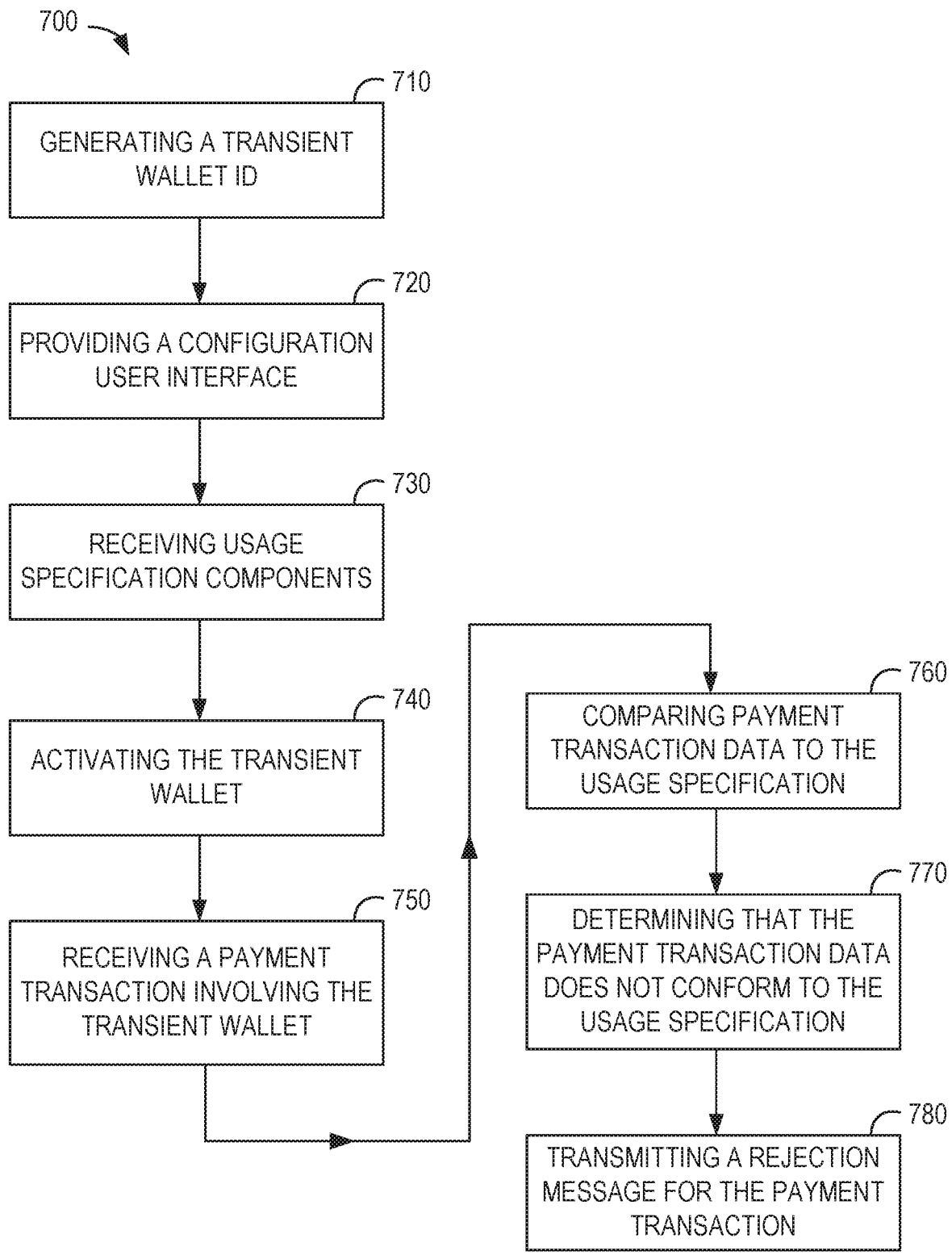
FIG. 7 illustrates an example computer-implemented method for implementing a transient mobile wallet on a secondary device.

FIG. 7 illustrates an example computer-implemented method 700 for implementing a transient wallet 222 on a secondary device 220. The computer-implemented method 700, hereafter referred to as "the method 700," is performed by a computing device comprising at least one hardware processor and a memory. In the example embodiment, the method 700 includes generating a transient wallet identifier (ID) for a transient mobile wallet, the transient mobile wallet being of limited duration (see operation 710). The method 700 also includes providing a configuration user interface to a first computing device of a user, the configuration user interface presenting configuration information for the transient mobile wallet (see operation 720). The method 700 further includes receiving one or more configuration elements of the transient mobile wallet through the user interface, the one or more configuration elements forming at least part of a usage specification for the transient mobile wallet, the usage specification defining allowed uses for the transient mobile wallet (see operation 730).

Further, the method 700 includes activating the transient mobile wallet on a secondary (e.g., transient) computing device for use in payment transactions, the secondary computing device being not owned by the user (see operation 740). The method 700 also includes receiving a payment transaction approval request including payment transaction data for a first payment transaction involving the transient mobile wallet (see operation 750). The method 700 further includes comparing the payment transaction data to the usage specification (see operation 760). The method 700 also includes determining that the payment transaction data does not conform to the usage specification (see operation 770) and transmitting a rejection message for the first payment transaction (see operation 780).

In some embodiments, the method 700 further includes providing an activation user interface to the user, the activation user interface enabling the user to activate the transient mobile wallet, receiving the transient wallet ID through the activation user interface, accessing the usage specification based on the transient wallet ID, and displaying a first configuration element of the one or more configuration elements on the activation user interface. In some embodiments, the activation user interface enables the user to change the first configuration element, and the method 700 further includes receiving an altered configuration element via the activation user interface, and updating the usage specification with the altered configuration element.

In some embodiments, the usage specification includes effective data for the transient mobile wallet, the effective data defining an aspect of when the transient mobile wallet may be used, and comparing the payment transaction data further includes comparing a transaction date to the effective data, and determining that the payment transaction data does not conform to the usage specification further includes determining that the transaction date does not conform with the effective data based on the comparing of the transaction date to the effective data.

In some embodiments, the method 700 further includes determining a location of the payment transaction, the usage specification includes geographic data for the transient mobile wallet, the geographic data defining a geographic aspect of where the transient mobile wallet may be used, comparing the payment transaction data further includes comparing the location of the payment transaction to the geographic data, and determining that the payment transaction data does not conform to the usage specification further includes determining that the location of the payment transaction does not conform with the geographic data based on the comparing the location of the payment transaction to the geographic data.

In some embodiments, the method 700 further includes deactivating the transient mobile wallet based on the determining that the payment transaction does not conform to the usage specification. Further, in some embodiments, the method 700 also includes identifying a first component of the usage specification as a deactivation criterion, determining that the payment transaction does not conform to the usage specification further includes determining that the payment transaction does not conform to the first component, and deactivating the transient mobile wallet is further based on the payment transaction not conforming to the first component.

Figure 8:
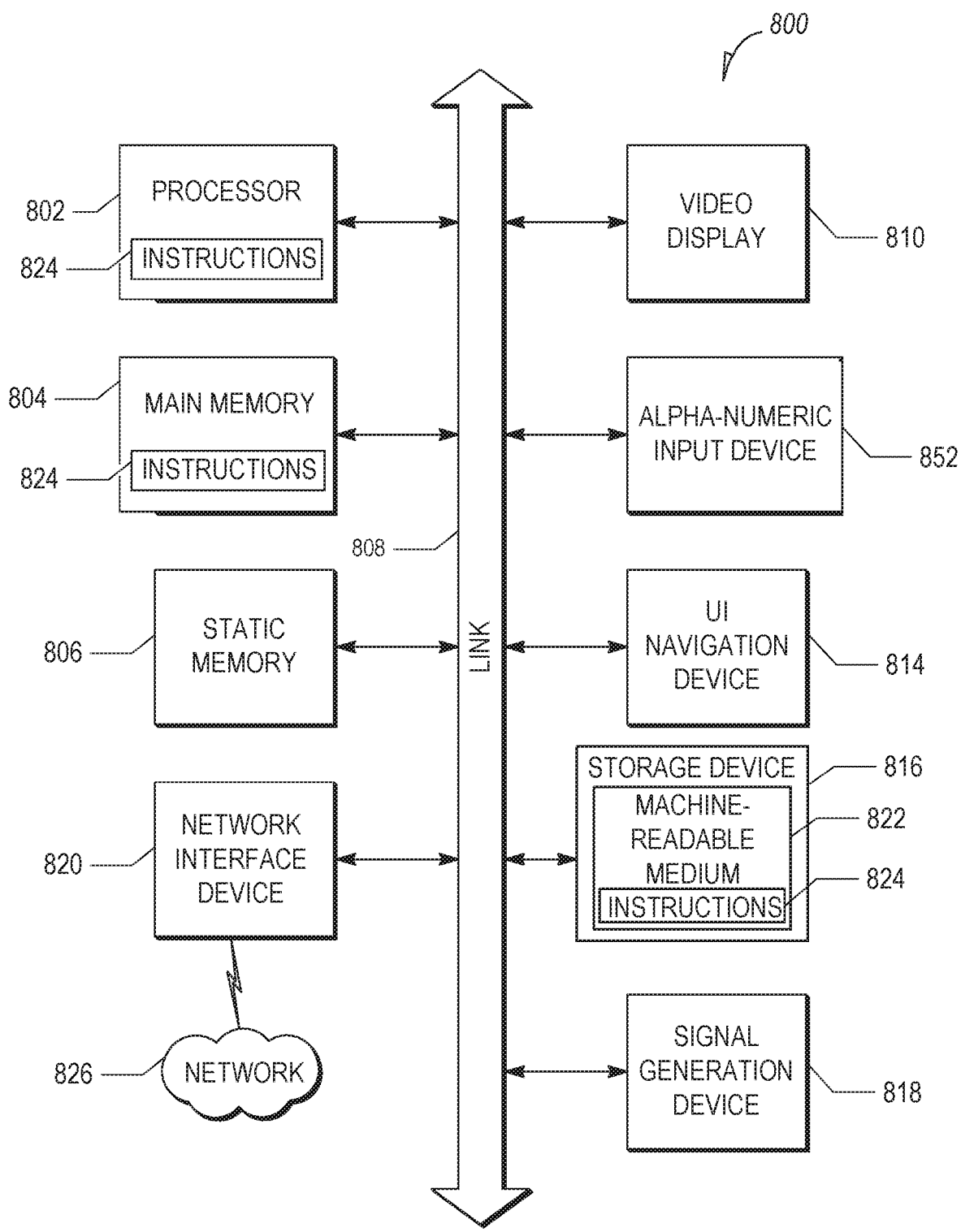
FIG. 8 is a block diagram of a machine in the example form of a computer system within which a set of instructions may be executed, for causing the machine to perform any one or more of the methodologies discussed herein.

FIG. 8 is a block diagram illustrating a machine in the example form of a computer system 800, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 can further include a video display unit 810, an alphanumeric input device 852 (e.g., a keyboard), and a user interface (UI) navigation device 814 (e.g., a mouse). In one embodiment, the video display unit 810, input device 852 and UI navigation device 814 are incorporated into a touch screen display. The computer system 800 can additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions (e.g., instructions 824) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wallet management system comprising:
    at least one hardware processor;
    a memory storing instructions that, when executed by the at least one hardware processor, cause the at least one hardware processor to perform operations comprising:
        receiving, from a primary mobile wallet executing at a first computing device, a request to generate a transient mobile wallet;
        receiving, from the primary mobile wallet, usage specification data;
        generating a transient wallet identifier (ID) for the transient mobile wallet;
        receiving from the transient mobile wallet executing at a second computing device an authentication request, the authentication request including the transient wallet ID and an authentication token;
        responsive to the authentication request, activating the transient mobile wallet on the second computing device for use in payment transactions;
        receiving a payment transaction approval request including payment transaction data for a first payment transaction involving the transient mobile wallet;
        comparing the payment transaction data to a usage specification comprising the usage specification data;
        determining that the payment transaction data does not conform to the usage specification; and
        based on the determining, transmitting a rejection message for the first payment transaction.

2. The system of claim 1, wherein the instructions further cause the at least one hardware processor to perform operations comprising:
    providing a configuration user interface to the first computing device, the configuration user interface presenting configuration information for the transient mobile wallet; and
    receiving one or more configuration elements of the transient mobile wallet through the configuration user interface, the one or more configuration elements forming at least part of the usage specification for the transient mobile wallet.

3. The system of claim 2, wherein the instructions further cause the at least one hardware processor to perform operations comprising:
    providing an activation user interface to the transient mobile wallet executing at the second computing device, the activation user interface enables the user to activate the transient mobile wallet, wherein the transient wallet ID is received via the activation user interface;

accessing the usage specification based on the transient wallet ID; and displaying a first configuration element of the one or more configuration elements on the activation user interface.

4. The system of claim 3, wherein the activation user interface enables the user to change the first configuration element, wherein the instructions further cause the at least one hardware processor to perform operations comprising:

receiving an altered configuration element via the activation user interface; and updating the usage specification with the altered configuration element.

5. The system of claim 1, wherein the usage specification includes effective date data for the transient mobile wallet, the effective date data defining an aspect of when the transient mobile wallet may be used, wherein comparing the payment transaction data further includes comparing a transaction date to the effective date data, wherein determining that the payment transaction data does not conform to the usage specification further includes determining that the transaction date does not conform with the effective date data based on the comparing of the transaction date to the effective data.

6. The system of claim 1, wherein the instructions further cause the at least one hardware processor to perform operations comprising determining a location of the first payment transaction, wherein the usage specification includes geographic data for the transient mobile wallet, the geographic data defining a geographic aspect of where the transient mobile wallet may be used, wherein comparing the payment transaction data further includes comparing the location of the first payment transaction to the geographic data, wherein determining that the payment transaction data does not conform to the usage specification further includes determining that the location of the first payment transaction does not conform with the geographic data based on the comparing of the location of the first payment transaction to the geographic data.

7. The system of claim 1, wherein the instructions further cause the at least one hardware processor to perform operations comprising:

identifying a first component of the usage specification as a deactivation criterion, wherein determining that the first payment transaction does not conform to the usage specification further includes determining that the first payment transaction does not conform to the first component; and deactivating the transient mobile wallet based on the determining that the first payment transaction does not conform to the first component.

8. A computer-implemented method comprising:

receiving, from a primary mobile wallet executing at a first computing device, a request to generate a transient mobile wallet;

receiving, from the primary mobile wallet, usage specification data;

generating a transient wallet identifier (ID) for the transient mobile wallet;

receiving from the transient mobile wallet executing at a second computing device an authentication request, the authentication request including the transient wallet ID and an authentication token;

responsive to the authentication request, activating the transient mobile wallet on second computing device for use in payment transactions;

receiving a payment transaction approval request including payment transaction data for a first payment transaction involving the transient mobile wallet;

comparing the payment transaction data to a usage specification comprising the usage specification data;

determining that the payment transaction data does not conform to the usage specification; and based on the determining, transmitting a rejection message for the first payment transaction.

9. The computer-implemented method of claim 8, further comprising:

providing a configuration user interface to the first computing device, the configuration user interface presenting configuration information for the transient mobile wallet; and receiving one or more configuration elements of the transient mobile wallet through the configuration user interface, the one or more configuration elements forming at least part of the usage specification for the transient mobile wallet.

10. The computer-implemented method of claim 9, further comprising:

providing an activation user interface the transient mobile wallet executing at the second computing device, the activation user interface enables the user to activate the transient mobile wallet, wherein the transient wallet ID is received via the activation user interface;

accessing the usage specification based on the transient wallet ID; and displaying a first configuration element of the one or more configuration elements on the activation user interface.

11. The computer-implemented method of claim 10, wherein the activation user interface enables the user to change the first configuration element, the method further comprising:

receiving an altered configuration element via the activation user interface; and updating the usage specification with the altered configuration element.

12. The computer-implemented method of claim 8, wherein the usage specification includes effective date data for the transient mobile wallet, the effective date data defining an aspect of when the transient mobile wallet may be used, wherein comparing the payment transaction data further includes comparing a transaction date to the effective date data, wherein determining that the payment transaction data does not conform to the usage specification further includes determining that the transaction date does not conform with the effective date data based on the comparing of the transaction date to the effective date data.

13. The computer-implemented method of claim 8, further comprising determining a location of the first payment transaction, wherein the usage specification includes geographic data for the transient mobile wallet, the geographic data defining a geographic aspect of where the transient mobile wallet may be used, wherein comparing the payment transaction data further includes comparing the location of the first payment transaction to the geographic data, wherein determining that the first payment transaction data does not conform to the usage specification further includes determining that the location of the first payment transaction does not conform with the geographic data based on the comparing of the location of the first payment transaction to the geographic data.

14. The computer-implemented method of claim 13, further comprising:

identifying a first component of the usage specification as a deactivation criterion, wherein determining that the first payment transaction does not conform to the usage specification further includes determining that the first payment transaction does not conform to the first component; and deactivating the transient mobile wallet based on the determining that the first payment transaction does not conform to the first component.

15. A non-transitory computer-readable storage medium, the computer-readable storage medium including instructions that when executed by a computer, cause the computer to perform operations of:

receiving, from a primary mobile wallet executing at a first computing device, a request to generate a transient mobile wallet;

receiving, from the primary mobile wallet, usage specification data;

generating a transient wallet identifier (ID) for the transient mobile wallet;

receiving from the transient mobile wallet executing at a second computing device an authentication request, the authentication request including the transient wallet ID and an authentication token;

responsive to the authentication request, activating the transient mobile wallet on a secondary computing device for use in payment transactions;

receiving a payment transaction approval request including payment transaction data for a first payment transaction involving the transient mobile wallet;

comparing the payment transaction data to the usage specification;

determining that the payment transaction data does not conform to a usage specification comprising the usage specification data; and based on the determining, transmitting a rejection message for the first payment transaction.

16. The non-transitory computer-readable storage medium of claim 15, wherein the instructions further cause the computer to perform operations of:

providing an activation user interface the transient mobile wallet executing at the second computing device, the activation user interface enables the user to activate the transient mobile wallet, wherein the transient wallet ID is received via the activation user interface;

accessing the usage specification based on the transient wallet ID; and displaying a first configuration element on the activation user interface.

17. The non-transitory computer-readable storage medium of claim 16, wherein the activation user interface enables the user to change the first configuration element, wherein the instructions further cause the computer to perform operations of:

receiving an altered configuration element via the activation user interface; and updating the usage specification with the altered configuration element.

18. The non-transitory computer-readable storage medium of claim 15, wherein the usage specification includes effective date data for the transient mobile wallet, the effective date data defining an aspect of when the transient mobile wallet may be used, wherein comparing the payment transaction data further includes comparing a transaction date to the effective date data, wherein determining that the payment transaction data does not conform to the usage specification further includes determining that the transaction date does not conform with the effective date data based on the comparing of the transaction date to the effective date data.

19. The non-transitory computer-readable storage medium of claim 15, wherein the instructions further cause the computer to perform operations of determining a location of the first payment transaction, wherein the usage specification includes geographic data for the transient mobile wallet, the geographic data defining a geographic aspect of where the transient mobile wallet may be used, wherein comparing the payment transaction data further includes comparing the location of the first payment transaction to the geographic data, wherein determining that the payment transaction data does not conform to the usage specification further includes determining that the location of the first payment transaction does not conform with the geographic data based on the comparing of the location of the first payment transaction to the geographic data.

20. The non-transitory computer-readable storage medium of claim 15, wherein the instructions further cause the computer to perform operations of:

identifying a first component of the usage specification as a deactivation criterion, wherein determining that the first payment transaction does not conform to the usage specification further includes determining that the first payment transaction does not conform to the first component; and deactivating the transient mobile wallet based on the determining that the first payment transaction does not conform to the first component.

\* \* \* \* \*